United States Patent [19]
Kimiavi

[11] Patent Number: 5,495,510
[45] Date of Patent: Feb. 27, 1996

[54] PHASE SYNCHRONIZATION DEVICE INTEGRATED INTO THE DEMODULATOR STAGE OF A RECEIVER OF MULTI-PHASE MODULATOR SIGNALS

[75] Inventor: Mani Kimiavi, Paris, France

[73] Assignee: Alcatel Telspace, Nanterre Cedex, France

[21] Appl. No.: 177,312

[22] Filed: Jan. 4, 1994

[30] Foreign Application Priority Data

Jan. 6, 1993 [FR] France .................... 93 00051

[51] Int. Cl.$^6$ .............. H04L 7/00; H03D 3/24
[52] U.S. Cl. ............ 375/371; 375/354; 375/376; 375/373
[58] Field of Search ............... 375/118, 106, 375/120, 119, 118, 110, 111, 371, 354, 376, 373, 359, 362

[56] References Cited

U.S. PATENT DOCUMENTS

| | | | |
|---|---|---|---|
| 3,558,824 | 1/1971 | Ogawa | 179/15 |
| 4,466,108 | 8/1984 | Rhodes | . |
| 4,489,287 | 12/1984 | Nagumo | 331/1 |
| 4,918,446 | 4/1990 | Yagi | 341/94 |
| 5,022,056 | 6/1991 | Henderson | 375/119 |
| 5,311,523 | 5/1994 | Serizawa | 375/80 |

OTHER PUBLICATIONS

Viterbi & Viterbi, "Nonlinear estimation of PSK—Modulated Carrier Phase With Application to Burst Digital Transmission", *IEEE Transcations on Information Theory*, vol. 29, No. 4, Jul. 1983, pp. 543–551.

Sampio–Neto, Raimundo et al, "Carrier Recovery Performance in PSK Systems Using Transmission Pulses with a Square Root Raised Cosine Spectrum", *IEEE International Telecommunications Symposium*, 1990, Sep. 6, 1990, pp. 535–540.

D'Andrea, Aldo N. et al, "Carrier Phase Recovery for Narrow–Band Polyphase Shift Keyed Signals", *Alta Frequenza*, vol. 57, No. 10, Dec. 1988, pp. 67–73.

French Search Report FR 9300051 dated Sep. 16, 1993.

*Primary Examiner*—Edward L. Coles, Sr.
*Assistant Examiner*—Allan Esposo
*Attorney, Agent, or Firm*—Sughrue, Mion, Zinn, Macpeak & Seas

[57] ABSTRACT

A device for synchronizing the phase of each packet of a phase modulated digital signal comprises a correction module controlled by information supplied successively by two separate calculator circuits. The phase synchronization device can be integrated into the demodulator stage of a receiver for digital signals phase modulated with at least two phase states, this signal being transmitted by successive packets. The device comprises a corrector module for rotating the constellation of phase states of the received signal according to an indication representative of the angular offset of this constellation. For each received packet to be synchronized in phase, the angular offset indication controlling the corrector module is supplied initially, for a predetermined time, by a first calculator circuit implementing the Viterbi algorithm (first indication) and thereafter, after a switching time corresponding to the end of the predetermined time, by a second calculator circuit constituted by a phase-locked loop (second indication), the second calculator circuit being initialized with the first angular offset indication at the switching time. The device enables fast phase synchronization with good noise immunity.

8 Claims, 3 Drawing Sheets

53 ACCUMULATOR
43 2ND ORDER LOWPASS FILTER

44 PHASE ACCUMULATOR

PHASE SYNCHRONIZATION DEVICE INTEGRATED INTO THE DEMODULATOR STAGE OF A RECEIVER OF MULTI-PHASE MODULATOR SIGNALS

BACKGROUND OF THE INVENTION

1. Field of the Invention

The field of the invention is that of digital signals phase modulated with at least two phase states.

To be more precise the invention concerns a phase synchronization device designed to be integrated into the demodulator stage of a receiver for digital signals of this kind transmitted by successive packets.

2. Description of the Prior Art

A special application of the device of the invention is to TDMA (time division multiple access) modems used in a system of satellite repeaters, for example.

In a system of this kind data is transmitted in frames each made up of a plurality of packets. The corresponding signal is phase modulated and each packet begins with a carrier and timing recovery preamble comprising a specific number of symbols. For each packet received the TDMA modem must acquire phase synchronization before the end of the preamble provided for this purpose and then retain this phase synchronization until the next packet.

The general principle for demodulating a phase modulated digital signal is as follows: the received signal is passed through an intermediate frequency bandpass filter and then split into two components in phase quadrature by multiplying it respectively by the output signal of a local oscillator and by a signal in phase quadrature with the output signal of the local oscillator. Each of these two analog components is filtered and then converted into a digital component by a digital-analog converter.

Thus a succession of pairs of digital components in phase quadrature is received. The problem is to retrieve the symbols transmitted for these successive pairs.

The reasoning employed usually refers to the phase plane in which the theoretical phase states are represented in a first frame of reference and the actual phase states (corresponding to the successive pairs of components in phase quadrature) are shown in a second frame of reference, these two frames of reference having the same origin.

In each frame of reference a phase state is represented by a point whose cartesian coordinates are the phase component and the phase quadrature component.

In the general case of modulation with $2^n$ phase states the $2^n$ points corresponding to the $2^n$ theoretical phase states are, in the first frame of reference, on a common circle centered on the origin of the first frame of reference. The signal is not amplitude modulated and only the phase varies.

These $2^n$ points constitute the constellation of theoretical phase states of the modulation with $2^n$ phase states. The $2^n$ phase values associated with the various points of the constellation are:

$(2k+1)(\pi/2n)$, with $k \in [0, 2^n-1]$

Each phase state is associated with a symbol comprising n bits.

For example, the constellation of phase states of phase modulation with four phase states (quaternary phase-shift keying—QPSK) comprises four points with respective phases of $\pi/4$, $3\pi/4$, $5\pi/4$ and $7\pi/4$.

By taking a sufficient number of successive pairs of components in quadrature at the receiving end, there are also obtained $2^n$ points constituting the constellation of phase states of the received signal, two successive points of this constellation being separated by the same angular distance as two points of the constellation of theoretical phase states.

Although the first and second frames of reference, respectively associated with the constellation of theoretical phase states and the constellation of phase states of the received signal, have the same origin, they can rotate relative to each other because the phase reference (the abscissa axis) of each of the two frames of reference is chosen arbitrarily.

A specific object of the invention is a device for obtaining identical frames of reference. This amounts to choosing the same phase reference of the two frames of reference so that the two constellations are superposed.

Following this phase synchronization, a decision module is used to associate one of the possible $2^n$ symbols with each pair of components.

There remains an indeterminacy. As the two constellations have rotated relative to each other before they were superposed, it is impossible to determine directly if each symbol associated with a pair of components by the decision module is actually the right symbol.

This indeterminacy is resolved in an ambiguity resolving device on the output side of the decision module.

It therefore seems that a phase synchronization device adapted to be integrated into the demodulator stage of a receiver for digital signals phase modulated with $2^n$ phase states, where $n \geq 1$, must comprise a correction module for rotating the constellation of phase states of the received signals relative to the constellation of theoretical phase states in order to eliminate any phase shift. This rotation is conditioned by information representing the phase shift.

A first known solution for synchronizing the phase is to calculate the information representing the phase shift between the two constellations (receive and theoretical) using a phase-locked loop.

This first solution has good noise immunity.

However, it has the major drawback that it cannot ensure fast phase synchronization. This first solution applies exclusively to a signal with a continuous bit rate. The reception and the demodulation of a signal of this kind require only one phase synchronization, at the start of reception, there being no constraint as to the speed of this phase synchronization.

During subsequent reception the very good noise immunity of the phase-locked loop enables the synchronization to be maintained with very good accuracy.

The invention concerns phase synchronization of a digital signal transmitted by successive packets. In other words, in the context of the invention, each packet must be synchronized in phase before a predetermined short time period has elapsed. This short time period corresponds, for example, to a preamble comprising a limited number of symbols. The start of packet synchronization must then be maintained until the next packet.

It is therefore impossible, for reasons of speed, to use the first solution based on the use of a phase-locked loop to resolve the problem arising from phase synchronization of a digital signals transmitted by successive packets.

A second known solution which can resolve this problem of fast synchronization is to use a calculator circuit using the Viterbi algorithm in order to supply the correction module quickly with information representative of the phase shift.

Unlike a phase-locked loop, a circuit of this kind enables fast phase synchronization at the start of each packet.

Nevertheless, this second solution also has a major drawback, namely poor noise immunity leading to a high bit error rate (BER). In other words, although synchronization is achieved quickly this is at the cost of accuracy. This lack of accuracy, characteristic of the viterbi algorithm, is effective over the entire duration of the packet.

An object of the invention is to overcome the various drawbacks of the prior art.

To be more precise, one object of the invention is to provide a phase synchronization device adapted to be integrated into the demodulator stage of a receiver for phase modulated digital signals with at least two phase states, the signal being transmitted by successive packets.

Another object of the invention is to provide a device of this kind which enables fast phase synchronization, the duration of phase synchronization having to be less than a predetermined duration corresponding, for example, to the duration of the preamble of each packet.

Another object of the invention is to provide a device of this kind which enables the fast phase synchronization achieved at the start of the packet to be maintained with good noise immunity (and therefore a low BER) throughout the remaining duration of the packet.

In other words, an object of the invention is to provide a device of this kind enabling fast phase synchronization at the start of a packet with this synchronization retained with good noise immunity (and therefore a low BER) until the end of the packet.

SUMMARY OF THE INVENTION

These objects, and others that emerge below, are achieved in accordance with the invention by means of a phase synchronization device adapted to be integrated into the demodulator stage of a receiver of digital signals phase modulated with at least two phase states, said signal being transmitted by successive packets, said device comprising a corrector module for rotating the constellation of phase states of the received function according to information representative of the angular offset of said constellation, said angular offset corresponding to a phase shift, and two separate circuits for calculating said indication representative of the angular offset:

a first calculator circuit implementing the Viterbi algorithm to produce a first angular offset indication from a sequence constituted by a predetermined number of symbols of the received signal, a second calculator circuit constituted by a phase-locked loop providing a second angular offset indication from the signal received continuously; for each packet received, said indication representative of the angular offset of the constellation of phase states is supplied to the corrector module from an output of switching means receiving on its input side:

firstly, said first angular offset indication from the first calculator circuit, secondly, said second angular offset indication from the second calculator circuit, said switching means being controlled by a time-delay circuit so that said output of the switching means supplies initially, for a predetermined time, said first indication and thereafter, at a switching time corresponding to the end of said predetermined time, said second indication, said second calculator circuit being initialized with said first angular offset indication at said switching time.

Thus phase synchronization at the start of a packet is fast. The information representative of the angular offset of the constellation of phase states of the received signal is initially supplied by the first calculator circuit using the Viterbi algorithm. This algorithm provides a correct estimate of the phase shift from just a few received symbols, whence the high speed of this first calculator circuit.

Then, once this fast phase synchronization has been achieved, there is switchover from the above circuit (utilizing the Viterbi algorithm) to the second circuit (phase-locked loop), together with initialization of the second calculator circuit with the angular offset information calculated by the first circuit. In other words, after the moment at which switching occurs and until the end of the packet, the information representative of the angular offset is supplied by the second calculator circuit. This second calculator circuit has good noise immunity and is ideally suited to supplying information on low values of angular offset.

To summarize, the device according to the invention achieves phase synchronization:

fast, thanks to the use of a first calculator circuit using a process to determine the angular offset based entirely on the first symbols of the packet; and with low sensitivity to noise, thanks to the use of a second circuit (phase-locked loop) initialized with the angular offset value supplied by the first circuit and using a more refined and noise-free determination of the angular offset based on the succession of other symbols of the packet.

The phase-locked loop of the second calculator circuit preferably comprises:

a phase error detector;

a second order lowpass filter;

a phase accumulator.

The phase demodulation of the received signal is advantageously coherent demodulation.

In a preferred embodiment of the invention the phase demodulation is a demodulation with four phase states (QPSK demodulation).

In a specific embodiment of the invention said successive packets are grouped into TDMA (time division multiple access) frames, each packet beginning with a preamble constituted by a sequence comprising a specific number M of symbols, said predetermined duration preceding the time at which switching occurs being less than the duration of said preamble.

The device in accordance with the invention can therefore be used in a TDMA modem as used in satellite repeater systems in particular.

The predetermined number N of symbols of the received signals used to execute the Viterbi algorithm is advantageously N =17 symbols.

This number represents a good speed/performance trade-off. The accuracy of the angular offset information is proportional to the number of symbols used by the Viterbi algorithm, but the time to execute this algorithm (which has to be minimized) is also proportional to the number of symbols.

The various sets of quantified values used by the correction module to effect said rotation of the constellation of phase states are advantageously stored in a read only memory external to the correction module, each set of quantified values corresponding to a separate angular offset value.

In this way it is possible to use a large number of sets of separate values so that the synchronization can be achieved with greater precision.

In an advantageous embodiment of the invention the initialization of the second calculator circuit at the time switching occurs consists in injecting the first angular offset information into the more significant bits of the phase accumulator of the second calculator circuit.

The invention also consists in a receiver for digital signals phase modulated with at least two phase states, the signal being transmitted by successive packets, the receiver comprising a demodulator stage composed of:

an intermediate frequency bandpass filter;

a local oscillator;

a module for multiplying the filtered received signal firstly by the signal supplied by the local oscillator and secondly by a signal in phase quadrature with the signal supplied by the local oscillator, the two signals resulting from these multiplications corresponding to the two components of the received signal in phase quadrature to each other;

two anti-aliasing lowpass filters;

two analog/digital converters each for converting into digital form one of the filtered components in phase quadrature;

two Nyquist root lowpass filters;

a module for recovering timing from the components in phase quadrature, the output of the timing recovery module controlling the analog/digital converters;

a phase synchronization device according to the invention for rotating the constellation of phase states corresponding to the various pairs of filtered digital components in phase quadrature;

a decision module for associating a symbol with each pair of components in phase quadrature synchronized in phase;

an ambiguity resolving device for replacing the symbol resulting from the decision taken by the decision module with a correct symbol, Other features and advantages of the invention will emerge from the following description of a preferred embodiment of the invention given by way of non-limiting illustrative example only and the appended drawings.

DETAILED DESCRIPTION OF THE PREFERRED EMBODIMENT

Thus the invention concerns a phase synchronization device adapted to be integrated into the demodulator stage of a receiver for digital signals phase modulated with at least two phase states, the signal being transmitted by successive packets.

The device described below is designed to be implemented in a TDMA (time division multiple access) modem used in a satellite receiver, for example, the modulation employed being phase modulation with four phase states (quaternary phase-shift keying - QPSK).

Nevertheless, it is evident that the device may be readily adapted to many other applications without departing from the scope of the invention.

In a TDMA system the digital data is transmitted in frames each constituted by a plurality of successive packets and each packet is constituted by a sequence of bits that the receiver must retrieve. At the transmitting end the signal is phase modulated, each possible phase state corresponding to a separate symbol on at least one bit.

Thus in the case of QPSK modulation, each phase state ($\pi/4$, $3\pi/4$, $5\pi/4$, $7\pi/4$) corresponds to a symbol on two bits (respectively 00, 01, 11, 10).

Figure 1A:
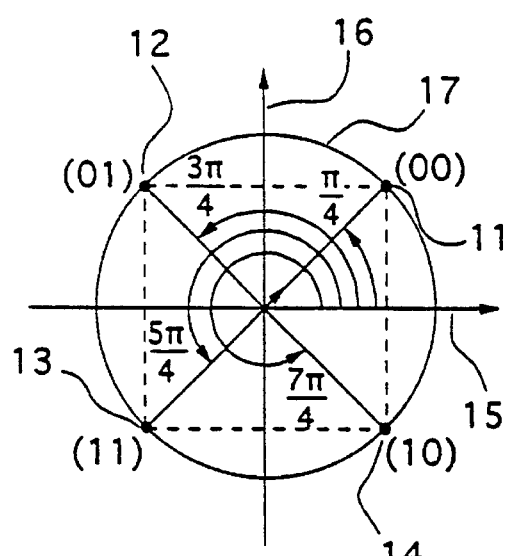
FIG. 1A shows the constellation of phase states of phase modulation with four phase states (QPSK).

FIG. 1A shows the constellation of theoretical phase states of the QPSK modulation.

Each point 11 through 14 of this constellation is at the end of a vector whose modulus and phase respectively correspond to the amplitude and phase of the modulated signal.

The null phase component of this vector is plotted on the abscissa axis 15 and its phase quadrature component is plotted on the ordinate axis 16.

As the signal is only phase modulated, the modulus of the vector is constant. Also, as the frame of reference is an orthonomic frame of reference, the end of the vector corresponding to the signal moves around a circle 17 as the phase of the modulated signal changes value. Consequently, the four points 11 through 14 of the constellation are on the circle 17.

At the receiving end the received signal must be demodulated in order to retrieve the sequence of bits of each packet. In this example demodulation is coherent.

Figure 2:
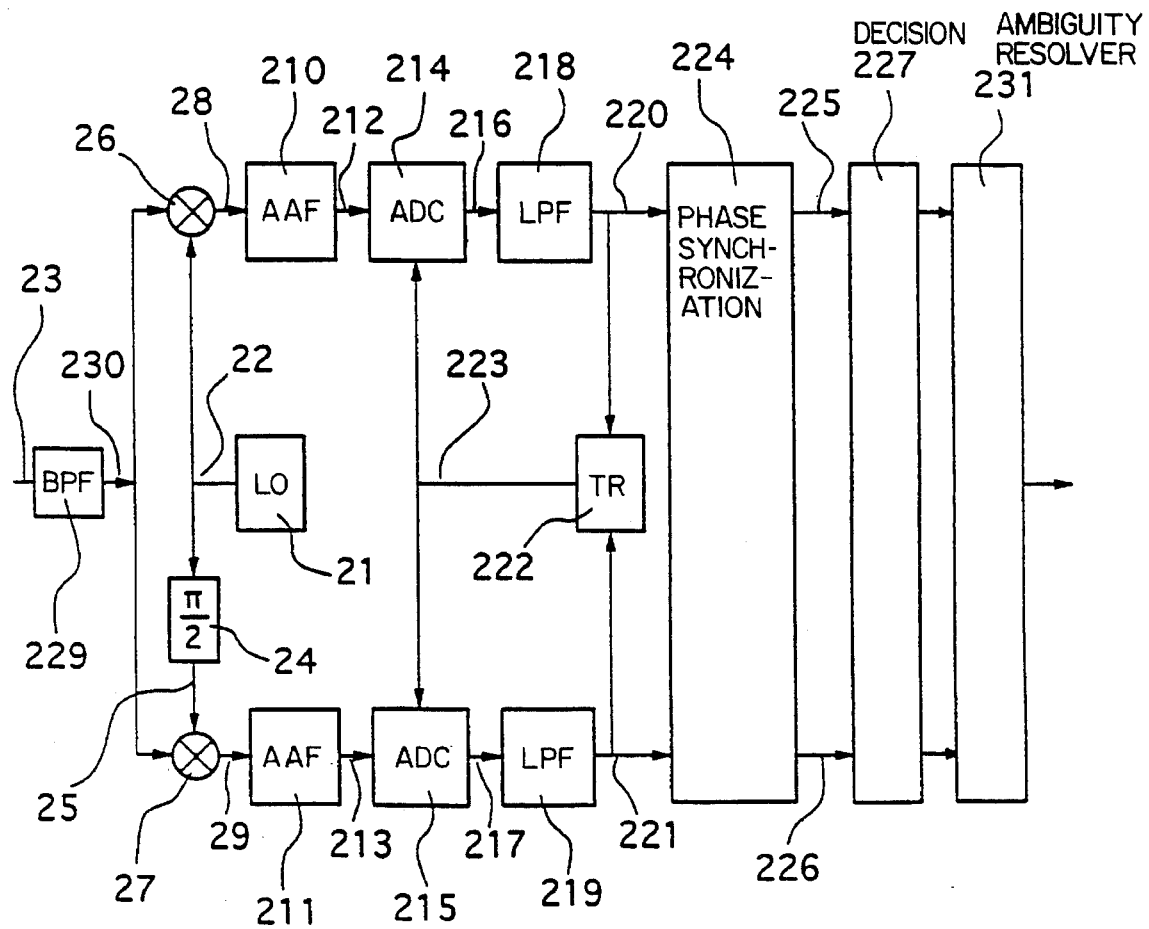
FIG. 2 shows a simplified block diagram of a demodulator stage of a digital signal receiver comprising a phase synchronization device in accordance with the invention.

FIG. 2 shows a simplified block diagram of a demodulator stage of a receiver for phase modulated digital signals (where the modulation corresponds to the constellation shown in FIG. 1A, for example).

The demodulator stage comprises:

an intermediate frequency bandpass filter 229;

a local oscillator 21;

a module 26, 27 for multiplying the filtered received signal 230 firstly by the signal 22 supplied by the local oscillator 21 and secondly by a signal 25 in phase quadrature with said signal 22 supplied by the local oscillator 21, the two signals 28, 29 resulting from said multiplications corresponding to the two components of the received signal 23 in phase quadrature to each other;

two anti-aliasing lowpass filters 210, 211;

two analog/digital converters 214, 215 each for converting into digital form one of said filtered components in phase quadrature 212, 213;

two Nyquist root lowpass filters 218, 219;

a module 222 for recovering timing from the components 220, 221 in phase quadrature, the output 223 of said timing recovery module 222 controlling said analog/digital converters 214, 215;

a phase synchronization device 224 according to the invention for rotating the constellation of phase states corresponding to the various pairs of filtered digital components 220, 221 in phase quadrature;

a decision module 227 for associating a symbol with each pair of components in phase quadrature synchronized in phase 225, 226;

an ambiguity resolving device 231 for replacing the symbol resulting from the decision taken by the decision module 227 with a correct symbol.

For each symbol to be determined there are two filtered digital components 220, 221 in phase quadrature at the outputs of the two lowpass filters 218, 219. These components are obtained from the received signal 23.

Figure 1B:
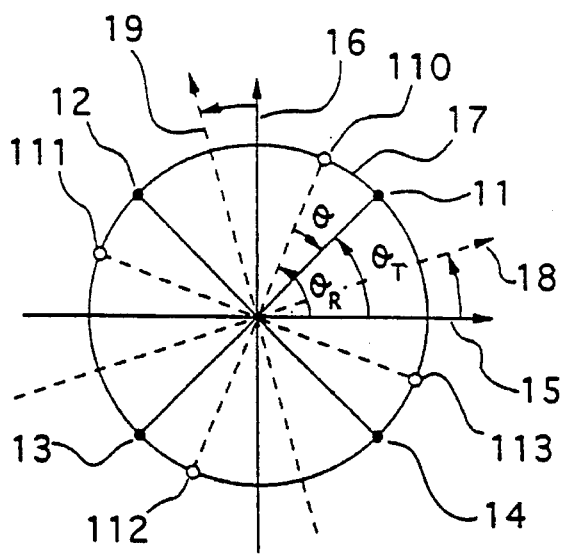
FIG. 1B shows the angular offset between the constellation of phase states of the received signal and the constellation of theoretical phase states shown in FIG. 1A.

As shown in FIG. 1B, for each of the various successive symbols to be determined the null phase component 220 and the phase quadrature component 221 are respectively plotted on the abscissa axis 18 and the ordinate axis 19 of an orthonomic frame of reference.

In the case of QPSK modulation, each pair of components corresponds to one of the four points 110 through 113 constituting the constellation of phase states of the received signals. These four points 110 through 113 are on the circle 17 which also supports the constellation of theoretical phase states (as shown in FIG. 1A).

The decision module 227 must associate one of the possible symbols (of which there are four in the case of QPSK modulation) with each pair of components in phase quadrature of each signal received.

This is possible only if the constellation of theoretical phase states (points 11 through 14) coincides with the constellation of phase states of the received signal (points 110 through 113), i.e. if phase synchronization of the received signal has been achieved.

The phase reference (i.e. the abscissa axis on which the null phase components are plotted) of the first frame of reference associated with the received signal (first frame of reference with axes 18 and 19) is chosen arbitrarily. Consequently, this phase reference is not usually coincident with the phase reference of the second frame of reference in which the constellation of the theoretical phase states is shown (second frame of reference with axes 15 and 16).

In the example shown in FIG. 1B there is an angular (or phase) offset $\theta = \theta_T - \theta_R$ between the first and second frames of reference, with $\theta_T = \pi/4$ the phase of the first point 11 of the constellation of theoretical phase states and $\theta_R$ the phase of the first point 110 of the constellation of phase states of the received signal, $\theta_T$ and $\theta_R$ being measured relative to the phase reference of the first frame of reference (i.e. the abscissa axis 15 of this frame of reference).

Note that this offset is measured modulo $\pi/2$.

The role of the device in accordance with the invention to eliminate this angular offset $\theta$ mod ($\pi/2$). In other words, the device in accordance with the invention enables the same phase reference to be adopted for both frames of reference.

Thus on synchronizing the phase of the two frames of reference the points 110 through 113 of the constellation of phase states of the received signal coincide with the points 11 through 14 of the constellation of theoretical phase states.

The decision module 227 associates a symbol with each pair of components in phase quadrature of the received signal.

Nevertheless, there remains an indeterminacy due to the fact that the phase offset is measured modulo $\pi/2$. Consequently, the symbol associated with a pair of components by the decision module is not necessarily the correct one.

An ambiguity resolving device 231 on the downstream side of the decision model resolves this indeterminacy.

Phase synchronization consists in determining the angular offset $\theta$ between the two constellations and then rotating the constellation of phase states of the received signal in order to cancel this angular offset.

Figure 3:
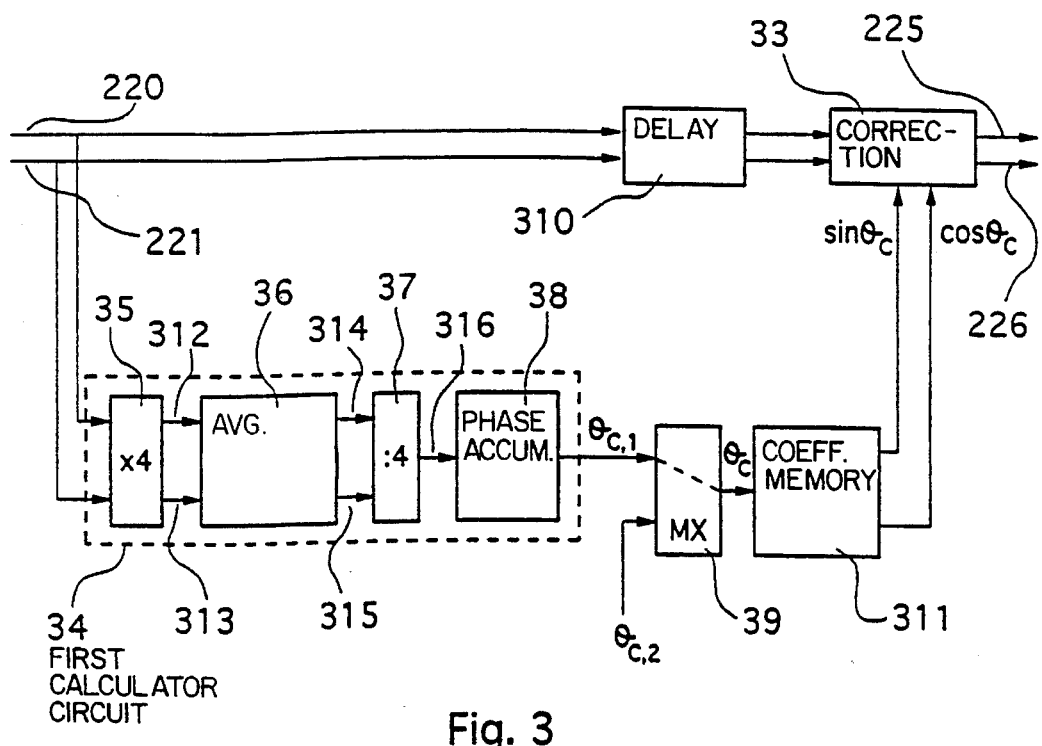
FIG. 3 shows a simplified partial block diagram of a synchronization device in accordance with the invention when the angular offset information is supplied by a first calculator circuit implementing the Viterbi algorithm.

FIG. 3 shows a partial simplified block diagram of a phase synchronization device in accordance with the invention when the angular offset information is supplied by a first calculator circuit implementing the Viterbi algorithm.

The synchronization device comprises a corrector module 33 for rotating the constellation of phase states of the received signals according to information representative of the angular offset $\theta$.

In the phase plane this is equivalent to rotating the vector whose digital quadrature components 220, 221 are those obtained at the output of the lowpass filters 218–219 of the demodulator stage. The components 225, 226 of the vector resulting from this rotation are associated with a point coinciding with one of the points 11 through 14 of the constellation of theoretical phase states.

The first calculator circuit 34 calculates a first angular offset indication $\theta_{c,1}$ representative of the actual angular offset $\theta$ from a sequence constituted by a predetermined number N of pairs of quadrature components 220, 221 of the received signal.

Each of these successive pairs corresponds to one symbol to be determined.

The first calculator circuit 34 comprises:

a multiplier module 35;

an averaging module 36;

a divider module 37;

an accumulator module 38.

The function of these modules is explained in detail below.

In accordance with the invention, the angular offset information $\theta_c$ actually used by the corrector module 13 may be either the first indication $\theta_{c,1}$ calculated by the first calculator circuit 34 or a second indication $\theta_{c,2}$ calculated by a second calculator circuit (as described with reference to FIG. 4). The circuit for switching between the first and second calculator circuits is explained in detail below with reference to FIG. 6.

Figure 4:
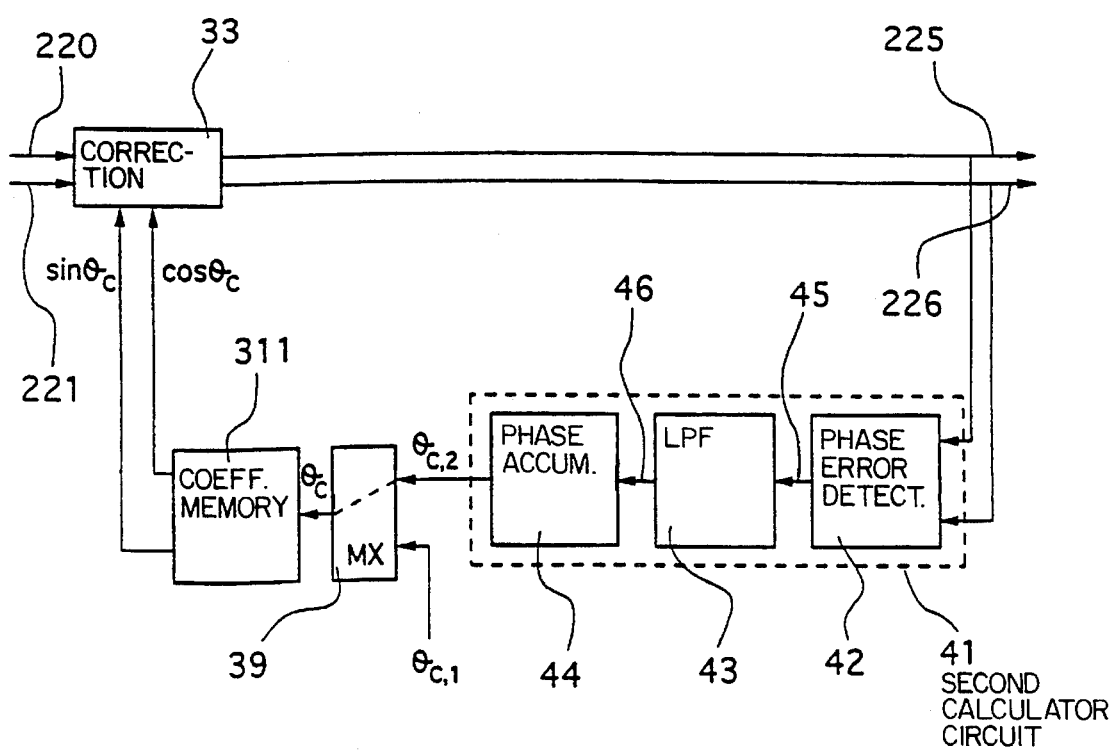
FIG. 4 shows a simplified partial block diagram of a synchronization device in accordance with the invention when the angular offset information is supplied by a second calculator circuit constituted by a phase-locked loop.

The switching circuit includes a multiplexer 39 for selecting a first angular offset indication $\theta_{c,1}$ as shown in FIG. 3, a second angular offset indication $\theta_{c,2}$ being selectable in other cases (cf FIG. 4).

The corrector module 33 rotates each received symbol (and therefore the constellation of phase states of the received signal) through an angle $\theta_c$ in order to eliminate the rotation of this constellation and to move the constellation into the proper position for taking a decision.

If the angular offset indication $\theta_c$ is that calculated by the first calculator circuit 34, as shown in FIG. 3, the components 220, 221 are delayed by a module 310 by an amount corresponding substantially to half the processing time of the first calculator circuit 34. Thus the corrector module 33 modifies the relevant pair of components 220, 221.

The rotation effected by the corrector module simply entails multiplying the components 220, 221 by a conventional rotation matrix of the type:

$$\begin{pmatrix} \cos\theta_c & -\sin\theta_c \\ \sin\theta_c & \cos\theta_c \end{pmatrix}$$

where $\theta_c$ is the angular offset indication calculated by one of the two calculator circuits.

In the embodiments shown in FIGS. 3 and 4 different sets of quantified values of the coefficients ($\cos\theta_c$ and $\sin\theta_c$) of the rotation matrix are stored in a memory module 311 external to the corrector module 33.

From the calculated angular offset indication $\theta_c$ the memory module 311 (which is a PROM, for example) supplies to the corrector module 33 the coefficients of the correction matrix to be applied to the components 220, 221 of the received signal.

The first calculator circuit 34 shown in FIG. 3 is a conventional circuit implementing the Viterbi algorithm.

In the case of QPSK modulation the operation of the first calculator circuit 34 is as follows: in the multiplier module 35, for each symbol of the received signal, the components 220, 221 which represent the cartesian coordinates of this symbol in a frame of reference of the phase plane are converted into polar coordinates (modulus $\rho$ and angle $\alpha$). The angle $\alpha$ is then multiplied by four, which is equivalent to eliminating the phase modulation. Finally, the resulting polar coordinates are converted into cartesian coordinates 312, 313.

The averaging module 36 produces an average from each coordinate 312, 313 and the preceding coordinates in the same series.

The coordinates 314, 315 averaged in this way are transmitted to the divider module 37. In the divider module 37 the averaged coordinates 314, 315 are again converted into polar coordinates. The corresponding angle is divided by four, the result of this division giving an estimated instantaneous phase shift 316 between two successive pairs of coordinates.

The successive instantaneous phase shifts 316 are accumulated in the accumulator module 38. The result of this is a first angular offset indication $\theta_{c,1}$ enabling the corrector module 33 to move the constellation into the proper position to take a decision.

In the preferred embodiment of the invention the value of the first angular offset indication $\theta_{c,1}$ is deemed to be correct, i.e. close to the actual angular offset $\theta_c$, after N=17 received symbols have been processed.

The choice of this number N =17 represents a speed/performance compromise. The first calculator circuit 34 is:

firstly, fast because it supplies an angular offset indication after processing just 17 received symbols; and effective because the calculations, and especially the averaging and the accumulation, are effected on a sufficiently large number of values.

The use of the first calculator circuit 34 to supply an angular offset indication is thus ideally suited to the TDMA system, and more generally to all systems in which the signal is transmitted by packets, each packet having to be phase synchronized.

In the TDMA system each packet starts with a preamble constituted by a sequence comprising a predetermined number M of symbols. Consequently, the number N of symbols of the received signal processed by the first calculator circuit 34 to supply the first angular offset indication $\theta_{c,1}$ must be less than the number M of symbols in the preamble of each packet.

FIG. 4 shows a partial simplified block diagram of a phase synchronization device in accordance with the invention when the angular offset indication is supplied by a second calculator circuit constituted by a phase-locked loop.

The corrector module 33 already described with reference to FIG. 3 multiplies the pair of components 220, 221 by a rotation matrix whose various sets of coefficients are stored in the memory module 311.

As shown in FIG. 4, the multiplexer 39 selects a second angular offset indication $\theta_{c,2}$, the selection of the first angular offset indication being the case shown in FIG. 3.

The second calculator circuit 41 calculates a second angular offset indication $\theta_{c,2}$ representative of the actual angular offset $\theta$ from the continuously received signal, to be more precise from the successive pairs of quadrature components 220, 221.

The second calculator circuit 41 is a phase-locked loop: the corrector module 33 is controlled by an angular offset indication calculated from the components 225, 226 output by the corrector module 33.

The second calculator circuit 41 comprises:

a phase error detector module 42;

a second order lowpass filter 43;

a phase accumulator module 44.

The module 42 estimates the instantaneous phase shift between two pairs of successive components 220, 221 and supplies a phase error 45 (denoted E) where:

$$E = X \cdot Y \cdot (X+Y)(X-Y)$$

where (X, Y) is the pair of components 225, 226 at the output of the corrector module 33.

The phase error 45 is also written:

$$E = \rho^4 \sin 4\alpha$$

where ($\rho$, $\alpha$) are the polar coordinates corresponding to the cartesian coordinates (X, Y).

The error 45 cancels out for $\alpha \in (\pi/4, 3\pi/4, 5\pi/4, 7\pi/4)$, i.e. when the rotation of the constellation is eliminated.

Figure 5:
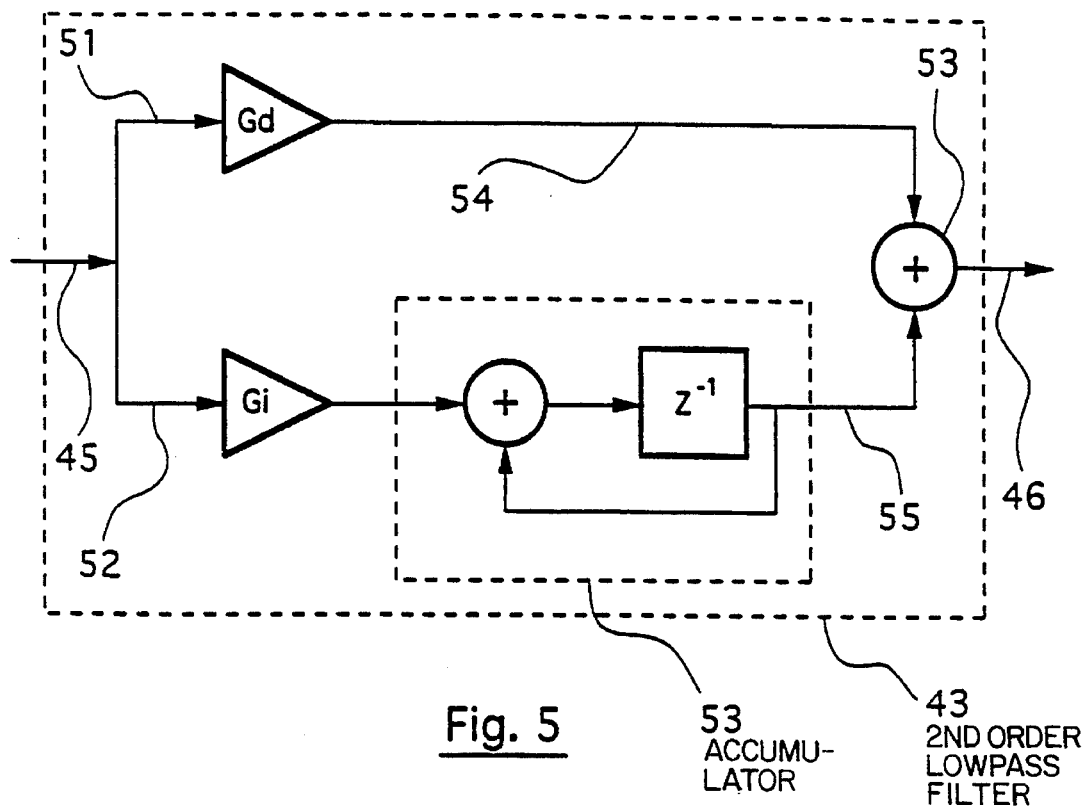
FIG. 5 shows a simplified block diagram of a second order lowpass filter used in the phase-locked loop shown in FIG. 4.

The phase error 45 is then filtered by a second order lowpass filter 43 as shown in FIG. 5. The filter 43 has two processing channels 51, 52.

The first channel 51 multiplies the phase error 45 by a coefficient Gd. The second channel 52 multiplies the phase error 45 by a coefficient Gi and accumulates the result of successive multiplications (53).

The results 54, 55 of the processing carried out by the two channels 51, 52 are summed (53) to produce the filtered phase error 46.

By choosing the gains Gi and Gd appropriately, the filter 43 eliminates noise and in particular phase jitter.

The filtered phase errors 46 of the successive received symbols are accumulated in the phase accumulator module 44. The result of this is the second angular offset indication $\theta_{c,2}$ enabling the corrector module 33 to move the constellation into the proper position for taking a decision.

In the device in accordance with the invention, for each received packet to be phase synchronized, the angular offset information controlling the corrector module responsible for eliminating the rotation of the constellation is supplied initially, during a predetermined time, by the first calculator circuit implementing the Viterbi algorithm and thereafter, after a switching time corresponding to the end of the predetermined duration, by the second calculator circuit constituted by a phase-locked loop. The second calculator circuit is initialized, at the switching time, with the angular offset indication calculated by the first calculator circuit.

Figure 6:
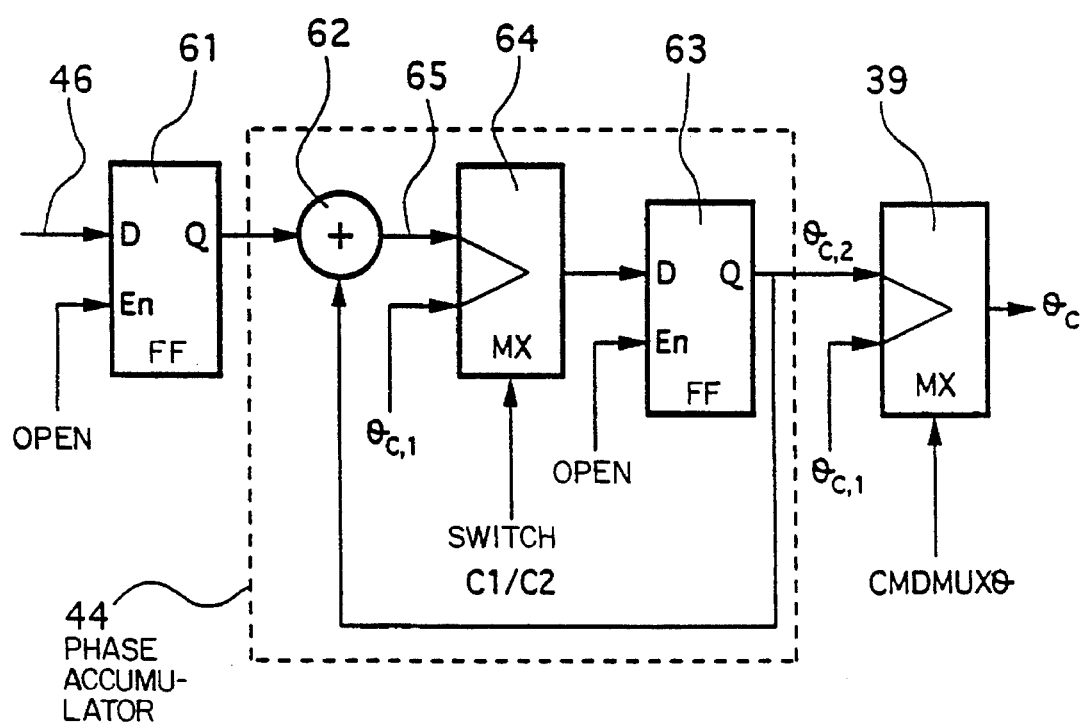
FIG. 6 shows a simplified block diagram of the circuit switching between the first calculator circuit shown in FIG. 3 and the second calculator circuit shown in FIG. 4.

FIG. 6 shows a simplified block diagram of the circuit switching between the first calculator circuit shown in FIG. 3 and the second calculator circuit shown in FIG. 4.

The angular offset indication $\theta_c$ supplied to the correction module comes from a first multiplexer 39 receiving on its input side:

firstly, the first angular offset indication $\theta_{c,1}$ from the first calculator circuit, and secondly, the second angular offset indication $\theta_{c,2}$ from the second calculator circuit.

The signal CMDMUX$\theta$ which controls the first multiplexer 39 is such that:

if CMDMUX$\theta$=1: the angular offset indication $\theta_c$ is equal to $\theta_{c,1}$ (calculated by the first circuit);

if CMDMUX$\theta$=0: the angular offset indication $\theta_c$ is equal to $\theta_{c,2}$ (calculated by the second circuit).

In the second calculator circuit the filtered phase error 46 is supplied to the phase accumulator 44 via a first flip-flop 61. The signal OPEN which controls this first flip-flop 61 is such that:

if OPEN =0: the filtered phase error 46 is blocked, if OPEN =1: the filtered phase error 46 is supplied to the phase accumulator 44.

The phase accumulator 44 comprises an adder 62 in series with a second flip-flop. Controlled by the same OPEN signal as the first flip-flop 61, the second flip-flop 63 retains the value of the filtered phase error during a clock period.

The output of the second flip-flop 63 and the output of the first flip-flop 61 constitute the two inputs of the adder 62 and enable successive phase errors to be accumulated.

The accumulator 44 also includes a second multiplexer 64 receiving on its input side firstly the signal 65 from the adder 62 and secondly the more significant bits of the first angular offset indication $\theta_{c,1}$.

The signal SWITCHC1/C2 which controls the second multiplexer 64 is such that:

if SWITCHC1/C2=0: the second flip-flop 63 receives the accumulated phase errors;

if SWITCHC1/C2=1: the second flip-flop 63 receives the more significant bits of the first angular offset indication $\theta_{c,1}$.

The first calculator circuit is used at the start of a packet. Consequently, CMDMUX$\theta$=1 and $\theta_c = \theta_{c,1}$. After a time period corresponding to 17 symbols, the angular offset $\theta_{c,1}$ is deemed to be sufficiently close to the actual angular offset to enable virtually total elimination of rotation of the constellation: the phase if synchronized.

After the 17th symbol, the second calculator circuit retrieves the phase produced by the first calculator circuit: the first angular offset indication $\theta_{c,1}$ is injected into the more significant bits of the phase accumulator 44 of the second calculator circuit. This is done in two stages:

in a first stage the signals SWITCHC1/C2 and then OPEN go to 1, in a second stage the signals SWITCHC1/C2 and then CMDMUX$\theta$ go to 0.

At the end of the packet the second calculator circuit is disabled by the OPEN signal going to 0.

This procedure is repeated for each of the successive packets.

In the preferred embodiment of the invention the first and second flip-flops 61 and 62, the adder 62 and the second multiplexer 64 operate on 16 bits, the second multiplexer 39 operating on eight bits. In this embodiment the eight more significant bits of the angular offset indication $\theta_{c,1}$ are injected into the phase accumulator 44 (via the second multiplexer 64) at the switching time, i.e. after the 17th received symbol.

The benefit of changing from the first calculator circuit to the second is twofold:

the first calculator circuit achieves fast phase synchronization but is sensitive to noise, the second calculator circuit is slow but has good noise immunity.

The device in accordance with the invention combines the advantages associated with these two types of circuit.

The device described above is adapted to be implemented in the demodulator stage of a TDMA modem. However, it is evident that many other embodiments of the invention are feasible. A number N of symbols different from 17 may be used in the first calculator circuit, for example. Likewise, the invention is not limited to QPSK modulation.

There is claimed:

1. Phase synchronization device adapted to be integrated into a demodulator stage of a receiver of digital signals phase modulated with at least two phase states, a signal being transmitted by successive packets, said device comprising:

a corrector module for rotating a constellation of phase states of a received function according to information representative of an angular offset of said constellation, said angular offset corresponding to a phase shift; and two separate circuits for calculating an indication representative of the angular offset:

a first calculator circuit implementing a Viterbi algorithm to produce a first angular offset indication from a sequence constituted by a predetermined number of symbols of a received signal, a second calculator circuit constituted by a phase-locked loop providing a second angular offset indication from a signal received continuously; wherein, for each packet received, said indication representative of the angular offset of the constellation of phase states is supplied to the corrector module from an output of switching means receiving on its input side:

firstly, said first angular offset indication from the first calculator circuit, and secondly, said second angular offset indication from the second calculator circuit; wherein said switching means is controlled by a time-delay circuit so that said output of the switching means supplies initially, for a predetermined time, said first angular offset indication and thereafter, at a switching time corresponding to an end of said predetermined time, supplies said second angular offset indication, said second calculator circuit being initialized with said first angular offset indication at said switching time.

2. Device according to claim 1 wherein said phase-locked loop of said second calculator circuit comprises:

a phase error detector;

a second order lowpass filter;

a phase accumulator.

3. Device according to claim 1 wherein a phase demodulation of the received signal is a coherent demodulation.

4. Device according to claim 1 wherein a phase demodulation is QPSK demodulation.

5. Device according to claim 1 wherein said successive packets are grouped into time division multiple access frames, each of said packets beginning with a preamble constituted by a sequence comprising a predetermined number of symbols, said predetermined time preceding the switching time being less than the time to receive said preamble.

6. Device according to claim 1 wherein said predetermined number of symbols of the received signal used when executing the Viterbi algorithm is 17 symbols.

7. Device according to claim 1 wherein various sets of quantified values used by the corrector module to rotate the constellation of phase states are stored in a read-only memory external to said corrector module, each of said sets of quantified values corresponding to a separate angular offset value.

8. Device according to claim 1 wherein said initialization of said second calculator circuit at said switching time consists in injecting said first angular offset indication into the more significant bits of said phase accumulator of said second calculator circuit.

* * * * *